(12) United States Patent
Combet et al.

(10) Patent No.: US 6,390,479 B1
(45) Date of Patent: May 21, 2002

(54) MANUFACTURE OF GASKETS

(75) Inventors: Alexis Yves Marie Anne Combet, Lyon (FR); Robert William Braund, Scarborough; Aktar Husein Somalya, West Bridgford, both of (GB)

(73) Assignee: Federal-Mogul Technology Limited, Rugby (GB)

( * ) Notice: Subject to any disclaimer, the term of this patent is extended or adjusted under 35 U.S.C. 154(b) by 0 days.

(21) Appl. No.: 09/508,825

(22) PCT Filed: Oct. 6, 1998

(86) PCT No.: PCT/GB98/02982

§ 371 Date: Mar. 16, 2000

§ 102(e) Date: Mar. 16, 2000

(87) PCT Pub. No.: WO99/18374

PCT Pub. Date: Apr. 15, 1999

(30) Foreign Application Priority Data

Oct. 8, 1997 (GB) .............................................. 9721324

(51) Int. Cl.[7] .............................................. F02F 11/00
(52) U.S. Cl. ........................ 277/594; 277/591; 277/627; 277/650; 29/888.3; 29/527.2; 264/273
(58) Field of Search ........................... 29/888.03, 527.2; 277/591, 593, 594, 596, 611, 627, 638, 650; 264/274, 273

(56) References Cited

U.S. PATENT DOCUMENTS

| 3,061,321 | A | * | 10/1962 | Smith | 277/637 |
|---|---|---|---|---|---|
| 4,223,547 | A | | 9/1980 | Epner | 72/254 |
| 5,033,189 | A | * | 7/1991 | Desverchere et al. | 277/594 |
| 5,267,740 | A | | 12/1993 | Stritzke | 277/235 B |
| 6,077,063 | A | * | 6/2000 | Santi | 264/275 |
| 6,189,895 | B1 | * | 2/2001 | Yamada | 277/594 |

FOREIGN PATENT DOCUMENTS

GB 612280 11/1948

* cited by examiner

Primary Examiner—Anthony Knight
Assistant Examiner—Enoch Peavey
(74) Attorney, Agent, or Firm—Synnestvedt & Lechner LLP

(57) ABSTRACT

A gasket is manufactured by a method which comprises applying heat to selected localised areas of a piece of sheet steel so that the structure of the steel is softened only in those areas. An opening is formed through said piece of sheet steel, the opening extending around a closed path in the sheet which passes through said softened areas. The opening has connecting webs extending across it at the softened areas. The method also comprises pressing said webs so that slots are formed in the top and bottom of each web, the slots connecting with the opening on both sides of the web. The method also comprises filling said opening and slots with resilient material which also forms sealing beads extending along said path and projecting from said opening and slots on both sides of the sheet.

5 Claims, 2 Drawing Sheets

MANUFACTURE OF GASKETS

This invention is concerned the manufacture of gaskets which comprise a steel sheet. The invention is applicable to head gaskets for internal combustion engines and to other types of gasket.

A gasket is intended to seal around a passage which passes between two members, the gasket being inserted between the two members. Thus, in the case of a head gasket, the gasket seals around cylinder bores, coolant passages, and oil passages which pass between the cylinder block of the engine and the head of the engine.

One type of known head gasket comprises a steel sheet, eg of stainless steel. The sheet has various openings which correspond to the cylinder bores, coolant passages etc. The gasket also comprises a resilient bead on each side of the sheet. The resilient beads are formed of elastomeric material and extend around a closed path which surrounds those of the openings which require a seal. Each bead projects beyond the surface of the steel sheet so that it can provide a seal around the openings when the bead is compressed by contact with the head or the block of the engine. In some cases, such beads are secured to the surfaces of the steel sheet, eg by being moulded in situ. In other cases, the beads are received in grooves in the surfaces of the steel sheet. In the case with which the invention is concerned, however, the gasket also comprises an opening through the steel sheet, the opening extending around the closed path in the sheet, and the elastomeric material fills the opening and projects as beads on both sides of the sheet. However, in order to maintain the integrity of the steel sheet, the gasket has connecting webs extending across the opening containing the elastomeric material. The webs serve to connect the portion of the sheet which is enclosed by said path with the remainder of the sheet. In order to prevent said webs from disrupting the performance of the beads, the webs have slots formed in the top and bottom thereof, the slots connecting with the opening on both sides of the web and the resilient material also fills said slots. A gasket of this type is described in U.S. Pat. No. 5,267,740, wherein an elastomeric bead in an opening through a steel sheet is described, there being webs (referred to as "connecting struts") extending across the opening.

In a conventional method of manufacturing a gasket of the type with which the invention is concerned, a piece of sheet steel is blanked to the outline shape of the gasket and the various holes for cylinder bores etc are blanked out. Also in such a method, an opening is formed through said piece of sheet steel, the opening extending around the closed path in the sheet which is to be taken by the beads. This opening has connecting webs extending across it at selected points, the webs being formed by interruptions in the opening, ie the steel is not disturbed at the webs. The method also comprises pressing said webs so that said slots are formed in the top and bottom of each web, the pressing operation causing the webs to expand along the opening. The method also comprises filling said opening and slots with resilient material, usually by moulding in situ. The resilient material also forms said sealing beads.

In the above-mentioned method of manufacturing a gasket of the type with which the invention is concerned, the pressing operation on the webs is found to be difficult and to cause excessive wear on expensive tooling.

It is an object of the present invention to provide a method of manufacturing a gasket in which said pressing operation can be carried out more easily and without excessive wear on the tooling.

The invention provides a method of manufacturing a gasket, characterised in that the method comprises applying heat to selected localised areas of a piece of sheet steel so that the structure of the steel is softened only in those areas, and forming an opening through said piece of sheet steel, the opening extending around a closed path in the sheet which passes through said softened areas, the opening having connecting webs extending across it at the softened areas, the webs being formed by interruptions in the opening, the webs serving to connect the portion of the sheet which is enclosed by said path with the remainder of the sheet, the method also comprising pressing said webs so that slots are formed in the top and bottom of each web, the slots connecting with the opening on both sides of the web, the method also comprising filling said opening and slots with resilient material which also forms sealing beads extending along said path and projecting from said opening and slots on both sides of the sheet.

In a method according to the invention, the pressing operation takes place on areas which have been softened by heating (these could be termed "annealed areas") so that it is easier to displace the steel and less wear on the tools occurs. A hardness reduction of up to 50% can readily be achieved.

Preferably, said selected localised areas are heated to at least 700° C., eg about 900° C., to soften the structure of the steel (or, in other words, to anneal the structure of the steel). It is, of course, necessary to avoid melting the steel or deforming the sheet.

Said heat may be applied by inducing an electrical current in said selected areas. Thus, electromagnets may be arranged in pairs above and below the steel sheet at the selected localised areas and operated to induce an electrical current on the steel sheet.

Alternatively, said heat may be applied by passing an electrical current through said selected areas. Thus, electrodes may be arranged in pairs above and below the steel sheet at the selected localised areas and operated to pass an electrical current through said sheet.

The invention also provides a gasket comprising a steel sheet, the sheet having an opening therethrough, the opening extending around a closed path in the sheet, the opening having connecting webs extending across it which serve to connect the portion of the sheet which is enclosed by said path with the remainder of the sheet, said webs having slots formed in the top and bottom thereof, the slots connecting with the opening on both sides of the web, the gasket also comprising resilient material which fills said opening and slots and forms sealing beads extending along said path and projecting from said opening and slots on both sides of the sheet, characterised in that said webs are formed from steel which has a softer structure than the remainder of the sheet.

There now follows a detailed description, to be read with reference to the accompanying drawings, of a method of manufacturing a gasket which is illustrative of the invention.

Figure 1:
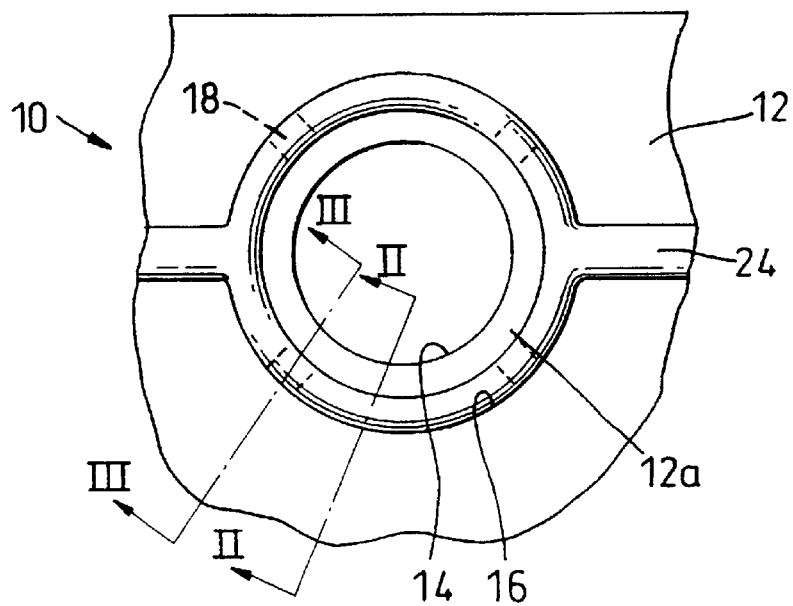
FIG. 1 is a partial plan view of the illustrative gasket.
Figure 2:
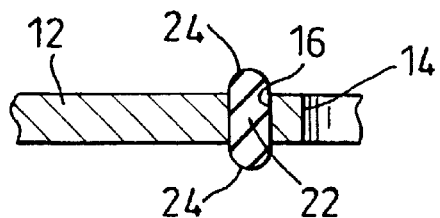
FIGS. 2 and 3 are cross-sectional views taken on the lines II—II and III—III in FIG. 1, respectively.
Figure 3:
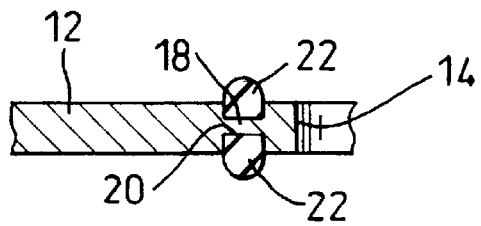
Figure 4:
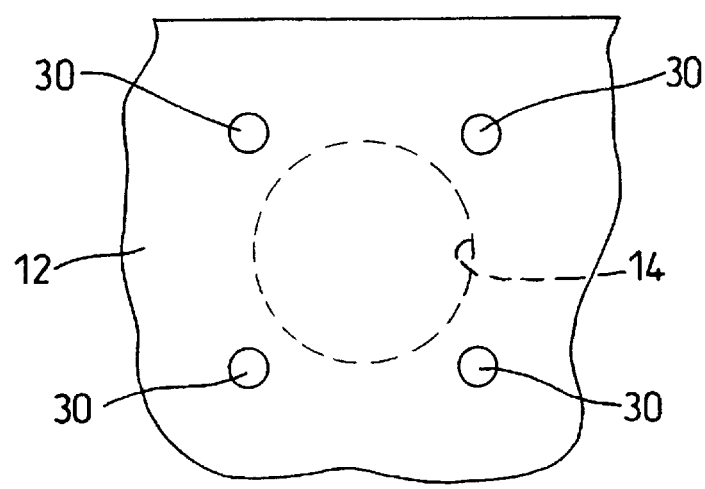
FIGS. 4 to 6 illustrate successive stages of the illustrative method, FIGS. 4 and 6 being partial plan views similar to FIG. 1 and FIG. 5 being a transverse cross-sectional view similar to FIG. 3.

The illustrative method is for manufacturing the illustrative gasket 10 which is partially shown in FIGS. 1 to 3 of the drawings. The gasket 10 is a head gasket for an internal combustion engine. The illustrative gasket 10 comprises a stainless steel sheet 12 which is 0.6 mm in thickness. The sheet 12 is generally rectangular in plan view but has generally circular openings therethrough corresponding to the cylinder bores, coolant passages, oil passages and bolt holes of the engine, one of these openings 14 is shown in FIGS. 1, 2, 3 and 6 and its position is indicated in broken line in FIG. 4.

The sheet 12 also has an opening 16 therethrough which is long and thin and extends around a closed path in the sheet 12 surrounding the opening 14. The opening 16, in fact, follows an intricate path which loops around many openings through the sheet 12. The sheet 12 also comprises connecting webs 18 which extend across the opening 16. The webs 18 are formed integrally with the sheet 12 and serve to connect the portion 12a of the sheet 12 which is enclosed by the path of the opening 16 with the remainder of the sheet 12. There are four webs 18 spaced around the periphery of the portion 12a of the sheet 12. The webs 18 are formed from steel which has a softer structure than the remainder of the sheet 12. Said webs 18 have slots 20 formed in the top and bottom thereof. The slots 20 are 0.15 mm deep and connect with the opening 16 on both sides of the web 18, ie the webs 18 are half-way up the opening 16 (see FIG. 3).

The gasket 10 also comprises resilient elastomeric material 22 which fills said opening 16 and slots 20 and forms sealing beads 24. One of the beads 24 projects beyond the upper surface of the sheet 12 and the other bead 24 projects beyond the lower surface of the sheet 12. Thus, both beads 24 extend around the path defined by the opening 16. Thus, the beads 24 encircle the portion 12a (and therefore the opening 14) and can form seals around the opening 14 when the gasket 10 is compressed between a head and a block.

The illustrative method commences with a roll of sheet stainless steel (not shown) from which a length is cut to form the sheet 12. At this point, the sheet 12 has no openings therethrough.

Figure 5:
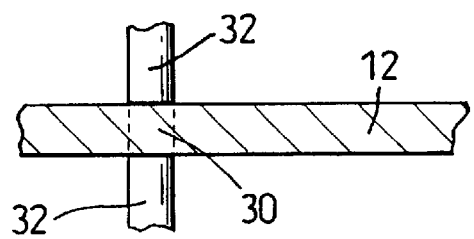
Figure 6:
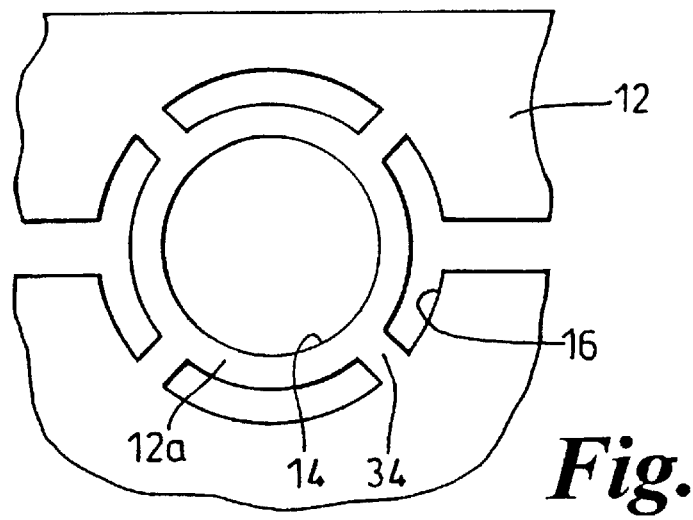

The illustrative method comprises applying heat to four selected localised areas 30 (see FIG. 4) of the sheet 12 to heat them to 900° C. so that the structure of the steel is softened only in those areas 30. The areas 30 are positioned relative to one another in the same relative positions occupied by the webs 18. The heating is achieved by positioning the sheet 12 between two arrays of electrodes 32. The electrodes 32 in each array are arranged in the same relative positions as are the localised areas 30. The arrays are brought into contact with the sheet 12 (see FIG. 5) so that each area 30 is between two of the electrodes 32 and the electrodes are operated to cause an electrical current to pass through the area 30 heating it.

Next in the illustrative method, conventional blanking tools (not shown) are used to form the openings 14 and 16. The sheet 12 is shown in this condition in FIG. 6. It should be noted that the opening 16 follows a closed path which passes through said softened areas 30. In other words, the opening 16 interconnects the areas 30. At this point, the areas 30 which represent interruptions in the opening 16 have their original thickness and form connecting webs 34 of the same thickness as the sheet 12 extending across the opening 16. The webs 34 serve to connect the portion 12a of the sheet 12 to the remainder of the sheet 12 (otherwise the portion 12a would fall out).

The illustrative method also comprises pressing said webs 34 between tools (not shown) to form the webs 18. This pressing forms the slots 20 in the top and bottom of each web 18. During the pressing, the width of the webs 18 increases in the longitudinal direction of the opening 16.

The illustrative method also comprises filling said opening 16 and slots 20 with the resilient material 22 which also forms the sealing beads 24. This is achieved by mounting the sheet 12 in a moulding machine and moulding the material 22 in situ.

What is claimed is:

1. A method of manufacturing a gasket, wherein the method comprises applying heat to selected localised areas of a piece of sheet steel so that the structure of the steel is softened only in those areas, and forming an opening through said piece of sheet steel, the opening extending around a closed path in the sheet which passes through said softened areas, the opening having connecting webs extending across it at the softened areas, the webs being formed by interruptions in the opening, the webs serving to connect the portion of the sheet which is enclosed by said path with the remainder of the sheet, the method also comprising pressing said webs so that slots are formed in the top and bottom of each web, the slots connecting with the opening on both sides of the web, the method also comprising filling said opening and slots with resilient material which also forms sealing beads extending along said path and projecting from said opening and slots on both sides of the sheet.

2. A method according to claim 1, wherein said selected localised areas are heated to at least 700° C. to soften the structure of the steel.

3. A method according to claim 1, wherein said heat is applied by inducing an electrical current in said selected areas.

4. A method according to claim 1, wherein said heat is applied by passing an electrical current through said selected areas.

5. A gasket comprising a steel sheet, the sheet having an opening therethrough, the opening extending around a closed path in the sheet, the opening having connecting webs extending across it which serve to connect the portion of the sheet which is enclosed by said path with the remainder of the sheet, said web being integral with the remainder of the sheet and having slots formed in the top and bottom thereof, the slots connecting with the opening on both sides of the web, the gasket also comprising resilient material which fills said opening and slots and forms sealing beads extending along said path and projecting from said opening and slots on both sides of the sheet, wherein said webs are formed from steel which has a softer structure than the remainder of the sheet.

* * * * *